Patented July 10, 1951

2,560,482

UNITED STATES PATENT OFFICE 2,560,482

DIPPED VINYL RESIN ARTICLE, COMPOSITION, AND METHOD

Clayton F. Ruebensaal, Baltimore, and Earl H. Sorg, Hydes, Md., assignors, by mesne assignments, to United States Rubber Company, New York, N. Y., a corporation of New Jersey No Drawing. Application March 15, 1949, Serial No. 81,624

4 Claims. (Cl. 260—28.5)

This invention relates to the art of synthetic resins and is particularly concerned with new and improved thin-walled dipped articles made from vinyl resins and with a new and improved method of making such articles.

It is well known that low molecular weight vinyl halide resins can be made into thin rubber-like articles by dissolving the resin in a solvent, such as acetone, and then rolling or otherwise forming the material into sheets. However, so far as we know, no one has ever commercially converted such resin solutions into thin-walled dipped articles exhibiting high tensile strength and good rubber-like properties. Since acetone is a solvent not only for these resins but also for the plasticizers and since, to form dipped goods of any substantial thickness, it is necessary to dip the forms into the solution several times, there is a tendency for the plasticizer of one dried film to be extracted to some extent by the acetone in the solution in the next wet film. As a result such dipped articles are not uniform in properties throughout the full thickness of the walls, some films or portions thereof having less plasticizer in them than others due to this extracting action of the solvent, and the physical properties of the articles will be lowered to extents depending on the amounts of plasticizer so extracted. Thus dipped articles made from low molecular weight vinyl halide resins have not been entirely satisfactory.

Efforts have been made to embody the higher molecular weight vinyl resins in emulsions, roughly resembling latex, but dipped articles produced therefrom do not have uniform wall thickness or the physical properties desired and are not satisfactory for many uses.

Attempts have been made to produce stronger articles by using higher molecular weight vinyl halide resins but, so far as we know, these attempts have not been entirely successful. The higher molecular weight resins do not dissolve in acetone and when dissolve in cyclohexanone or other suitable solvent, such as isophorone or acetonyl acetone, form solutions which are quite thick and which dry so slowly as to make manufacture of thin dipped goods therefrom commercially impractical.

We have discovered that the foregoing troubles and disadvantages which are traceable to extraction of the plasticizer and to solutions of too great viscosity may be avoided by dissolving the resin in a low vapor pressure solvent and diluting the resulting solution to the desired viscosity by means of a high vapor pressure diluent. When acetone, or some other suitable high vapor pressure diluent, is added to a solution of vinyl halide resins in cyclohexanone or some other suitable low vapor pressure solvent, the acetone in a freshly deposited film, does not extract any material amount of plasticizer from previously deposited and dried films, and the solution may have any desired viscosity within the range suitable for dipping. The dilution of the solution of the high molecular weight resin by a diluent which will evaporate rapidly while the solvent is still present makes it possible to prevent the formation of bubbles, vapor pockets and the like in dipped articles.

We have also discovered that the presence of a small amount of paraffin wax, for example, from about .01% to about .1% improves the flow characteristics of the solution on a form and tends to inhibit too rapid evaporation of the diluent. These factors are important in making thin-walled dipped articles because they permit the solution to distribute itself around, as well as lengthwise of, the form particularly when the form is moved into different positions after being removed from the solution and before the film has set.

By utilizing these discoveries we have been able to make articles from vinyl halide resins of various molecular weights which have high tensile strength and good rubber-like properties and are free from vapor pockets and bubbles.

We are, therefore, able to make thin-walled dipped articles from low molecular weight vinyl halide resins which have physical properties which are higher than prior dipped articles made from the same resins and which have walls which are substantially uniform in properties and thickness, ranging from about .001" or .002" to .005" or more in thickness. We are also able to make dipped articles having even higher physical properties from the higher molecular weight resins and with walls having about the range of dimensions stated above. These articles are truly rubber-like, that is, they may be stretched to between about 100% and about 400% of their original dimensions in any direction, and will snap back forceably to approximately their original dimension when released. This definition is like, but more limited than, those proposed by eminent workers in the art.

The present invention will be better understood by those skilled in the art from the following illustration but in limited examples.

*Example 1*

About 200 grams of a vinyl chloride-vinyl acetate copolymer containing from about 93% to 96% of the vinyl chloride was mixed with about 200 grams of dibutyl phthalate and about 0.2 gram of paraffin wax to form a uniform oily-like paste. Then about 500 cubic centimeters of cyclohexanone were added at once and the mixture was agitated until it became a smooth slurry which set. This slurry was converted into a clear solution by being heated at between about 100° C. and about 120° C. Then the temperature of the solution was lowered to and maintained at about 60° C. while it was being diluted by the slow addition thereto of about 2000 cubic centimeters of acetone, using a reflux condenser to prevent loss of the acetone. When the solution had become substantially uniform in viscosity it was allowed to cool to room temperature. When it is not important that the solution should flow on the mold as above mentioned, the paraffin wax may be omitted.

A form of a size and shape of the inside dimensions of the desired article was dipped into the foregoing solution at room temperature and after being withdrawn therefrom the film adhering to the form was allowed to set, by evaporation of the diluent and solvent, as by heating the article to a temperature of from about 40° C. to about 60° C., although lower or higher temperatures may be used depending on the speed with which it is desired to remove those ingredients.

*Example 2*

About 11.36 grams of a copolymer consisting of 95 to 98% vinyl chloride and 5 to 2% of vinyl acetate are mixed with about 2 grams of glycerol ricinolate and about 41.2 grams of dibutyl phthalate in 15 cc. of cyclohexanone. This mixture is heated at about 90° to 95° C. until a smooth viscous solution is obtained, after which the mixture is cooled to about 60° C. With the temperature of the solution being maintained at about 60° C., it is diluted by the slow addition thereto of 50 cc. of acetone with agitation. This diluted solution is added to about 45.44 grams of a vinyl chloride-vinyl acetate containing about 45% vinyl chloride in 250 cc. of acetone. The mixture is then refluxed for half an hour and the resultant dipping solution is used as described in Example 1.

*Example 3*

A dipping solution is made in accordance with the method described in Example 1, consisting of the following ingredients:

336 grams of a vinyl chloride-vinyl acetate copolymer containing about 95 to 98% vinyl chloride
221 grams dibutyl sebacate
73 grams dibutyl phthalate
70 grams chlorinated paraffin wax containing 40% chlorine
3.3 cc. per gram of resin of cyclohexanone
10 cc. per gram of resin of acetone.

The foregoing dipped and drying operations may be repeated as many times as desired depending upon the desired wall thickness of the article and the viscosity of the dipping solution. With the foregoing composition each dipping adds about .001″ to the wall thickness of the article and five dippings will be sufficient to make the wall about 0.005″ thick. Since each film attaches integrally to the previously formed film the final article is integral and is not laminated.

When the dipping form is reciprocated in a vertical plane about a horizontal axis at right angles to the longitudinal center line of the form and located at a point on the form which is not submerged in the solution and the form is rotated about its longitudinal axis, the solution, particularly when it includes the paraffin wax above mentioned, will flow lengthwise of and also circumferentially around the form with resultant substantially uniform spread of the solution on the form, thereby insuring substantial uniformity of wall thickness.

A tubular article with one end closed which resulted from the foregoing procedure had side walls which were substantially uniform in thickness. When the side walls were about 0.002″ thick the articles had a tensile strength of about 1320 lbs. per square inch, an elongation of about 650% in a specimen 7 inches long and $1\frac{3}{16}$ inches in diameter. At a tensile stress of about 1780 lbs. per square inch it had an elongation of about 450%.

It will be understood that plasticizer other than the ones specifically mentioned herein may be used so long as they have the ability to convert the resin into the desired rubber-like condition. For example, plasticizers suitable for such a purpose include ethoxyethyl adipate and ethoxyethyl phthalate.

Various diluents may be employed instead of acetone including butyl acetate and dioxane. These diluents have the properties of swelling or causing some dissolution of high molecular weight vinyl halide resins at a temperature at or near the boiling temperatures of the diluents. Various solvents for the high molecular weight resins may be used in the place of cyclohexanone including isophorone or acetonyl acetone. At a temperature of 50° C. the above mentioned high vapor pressure diluents have vapor pressure of 610, 47 and 125 mm. of mercury respectively; while the above mentioned low vapor solvents have a vapor pressure of 20, 1.6, and 3.3 mm. of mercury respectively.

The term "high molecular weight resin" as used herein means and includes resins which have molecular weights ranging above a minimum of about 20,000 as determined by the staudinger viscosity method.

Prophylactics, finger cots and the like are illustrations of commercial articles which can be made advantageously from the composition and by the method of this invention.

When articles embodying the present invention are to be sealed against loss of plasticizer the composition may contain a sealant of the type disclosed and claimed in our copending application Serial No. 685,837, filed July 24, 1946, that is, a chlorinated hydrocarbon selected from the group consisting of aliphatic hydrocarbons containing from about 20% to about 68% of chlorine and having more than 15 carbon atoms per molecule, and aromatic hydrocarbons containing from about 26% to about 63% of chlorine and having, per molecule, two or more benzene rings each united to another by two common carbon atoms.

When the articles of this invention are to be resistant to decomposition at high temperatures, the plasticizers above named should be replaced by diisobutyl adipate as disclosed and claimed in copending application Serial No. 496,153, filed July 26, 1943, now Patent No. 2,414,399, issued January 14, 1947.

This application is a continuation-in-part of the copending application of Clayton F. Ruebensaal and Earl H. Sorg, Serial Number 496,152, filed July 26, 1943, now abandoned.

Having thus described our invention so that others skilled in the art may be able to understand the same, we state that what we desire to secure by Letters Patent is defined in what is claimed.

We claim as our invention:

1. A rubber-like article formed from a dipping solution produced by the steps comprising mixing a vinyl halide resin having a molecular weight above about 22,000 with a plasticizer to form a smooth oily paste, adding a low vapor pressure solvent to the paste and converting the mixture into a slurry, dissolving the resin by heating the slurry at between about 100° C. to about 120° C., cooling the resulting solution to about 60° C., and diluting the resulting solution to the consistency desired by adding thereto a suitable amount of a diluent having a greater vapor pressure than said solvent.

2. The method of making a dipping solution comprising mixing a vinyl halide resin having a molecular weight above about 22,000 with a plasticizer to form a smooth oily paste, adding a low vapor pressure solvent to the paste and converting the mixture into a slurry, dissolving the resin by heating the slurry at between about 100° C. and about 120° C., cooling the resulting solution to about 60° C., and diluting the resulting solution to the consistency desired by adding thereto a suitable amount of a diluent having a greater vapor pressure than said solvent.

3. The method of making a dipping solution comprising mixing a vinyl halide resin having a molecular weight above about 22,000 with a plasticizer to form a smooth oily paste, adding cyclohexanone to the paste and converting the mixture into a slurry, dissolving the resin by heating the slurry at between about 100° C. and about 120° C., cooling the resulting solution to about 60° C., and diluting the resulting solution to the consistency desired by adding a suitable amount of acetone thereto.

4. The method of making a dipping solution comprising mixing a vinyl halide resin having a molecular weight above about 22,000 with a plasticizer and between about .01% and about .1% of paraffin wax to form a smooth oily paste, adding a low vapor pressure solvent to the paste and converting the mixture into a slurry, dissolving the resin by heating the slurry at between about 100° C. and about 120° C., cooling the resulting solution to about 60° C., and diluting the resulting solution to the consistency desired by adding thereto a suitable amount of diluent having a higher vapor pressure than the solvent.

CLAYTON F. RUEBENSAAL.
EARL H. SORG.

REFERENCES CITED

The following references are of record in the file of this patent:

UNITED STATES PATENTS

| Number | Name | Date |
|---|---|---|
| 2,245,708 | Patton | June 17, 1941 |

OTHER REFERENCES

Industrial and Engineering Chem., article by Schoenfeld et al., pages 964–968, August 1939, vol. 31, No. 8.